US012070922B1

(12) United States Patent
Smit

(10) Patent No.: US 12,070,922 B1
(45) Date of Patent: Aug. 27, 2024

(54) AUTOMATED PLANT SLEEVE PRODUCTION ASSEMBLY

(71) Applicant: Intech Engineering, Inc., Miami, FL (US)

(72) Inventor: John Smit, Miami, FL (US)

(73) Assignee: INTECH ENGINEERING, INC., Miami, FL (US)

( * ) Notice: Subject to any disclaimer, the term of this patent is extended or adjusted under 35 U.S.C. 154(b) by 416 days.

(21) Appl. No.: 17/443,072

(22) Filed: Jul. 20, 2021

Related U.S. Application Data

(63) Continuation-in-part of application No. 16/449,653, filed on Jun. 24, 2019, now Pat. No. 11,064,824.

(60) Provisional application No. 62/689,621, filed on Jun. 25, 2018.

(51) Int. Cl.

| | |
|---|---|
| ***A01G 5/02*** | (2006.01) |
| ***A47G 7/08*** | (2006.01) |
| ***B31B 70/26*** | (2017.01) |
| ***B65B 25/02*** | (2006.01) |
| ***B65B 43/10*** | (2006.01) |
| ***B65B 51/06*** | (2006.01) |
| ***B65D 85/52*** | (2006.01) |

(52) U.S. Cl.
CPC ............ *B31B 70/262* (2017.08); *A47G 7/085* (2013.01); *B65B 25/026* (2013.01); *B65B 43/10* (2013.01); *B65B 51/06* (2013.01); *B31B 2241/00* (2013.01)

(58) Field of Classification Search
CPC ........ A47G 7/085; B65B 25/02; B65B 43/10; A01G 5/02; B31B 70/262; B31B 2241/00
USPC .......................................................... 493/243
See application file for complete search history.

(56) References Cited

U.S. PATENT DOCUMENTS

| | | | | |
|---|---|---|---|---|
| 2,005,326 A | | 6/1935 | Schindler | |
| 2,511,417 A | | 6/1950 | Schindler | |
| 3,503,098 A | | 3/1970 | Shore | |
| 4,118,890 A | | 10/1978 | Shore | |
| 4,660,502 A | * | 4/1987 | Scott | B44C 7/04 118/DIG. 17 |
| 4,980,209 A | | 12/1990 | Hill | |
| 5,111,637 A | * | 5/1992 | Weder | B65B 25/02 53/410 |
| 5,493,809 A | | 2/1996 | Weder et al. | |

(Continued)

*Primary Examiner* — Robert F Long
*Assistant Examiner* — Xavier A Madison
(74) *Attorney, Agent, or Firm* — Malloy & Malloy, P.L.; Jennie S. Malloy

(57) ABSTRACT

An assembly for the production of conical paper sleeves for floral groupings comprises a system configured to continuously feed sheets of paper stock along an elongated surface of a folding table, wherein a first fold and a second fold are applied to a single sheet of paper stock with an amount of adhesive disposed there between using an assembly of belts, rollers, electrical motors, sensors, and fold guides, all of which may be electronically monitored and controlled by a processor disposed in connection with an operator console. Alternatively, the production of conical paper sleeves may instead comprise a semi-automated assembly configured to allow for the movement of an adhesive applicator along a predetermined route while an operator thereof manually applies a first fold and second fold to a single sheet of paper stock. Such predetermined route may be fully configurable and customizable by an operator of such semi-automated assembly.

13 Claims, 3 Drawing Sheets

100

(56) References Cited

U.S. PATENT DOCUMENTS

| | | | | |
|---|---|---|---|---|
| 5,945,195 | A * | 8/1999 | McDonald | B65H 45/30 283/106 |
| 6,007,895 | A | 12/1999 | McDonald | |
| 6,056,323 | A | 5/2000 | McDonald | |
| 6,298,601 | B1 * | 10/2001 | Weder | B65D 81/36 47/72 |
| 6,786,003 | B2 | 9/2004 | Gilbert | |
| 7,021,000 | B2 | 12/2006 | Weder | |
| 7,251,913 | B2 | 8/2007 | Weder | |
| 7,353,583 | B1 | 4/2008 | Clarke | |
| 7,396,320 | B2 | 7/2008 | Tchira | |
| 8,058,192 | B2 | 11/2011 | Helms | |
| 8,104,225 | B2 | 1/2012 | Weder | |
| 11,064,824 | B1 | 7/2021 | Smit | |

* cited by examiner

AUTOMATED PLANT SLEEVE PRODUCTION ASSEMBLY

CLAIM OF PRIORITY

The present application is a continuation-in-part and claims priority under 35 U.S.C. § 120 to a currently pending U.S. patent application having Ser. No. 16/449,653 and a filing date of Jun. 24, 2019, which has been allowed and is set to issue as U.S. Pat. No. 11,064,824 on Jul. 20, 2021, which is incorporated by reference herein in its entirety.

BACKGROUND OF THE INVENTION

Field of the Invention

The present invention relates to the production of paper sleeves from paper stock via a fully automated machine and/or a semi-automated assembly, each of which may be configured to transform precut and pre-sized paper stock into a conical paper sleeve, for use as a protective outer cover for the transportation of plants, flower plots, bouquets, and other like floral groupings.

Description of the Related Art

When transporting plants, flower pots, bouquets, and other like floral groupings, it is common to dispose such floral grouping within a conical sleeve, which may serve to protect such floral grouping while likewise ensuring the components thereof, such as flowers, leaves, and stems, and the soil disposed within a pot, do not become damaged or otherwise spill during transport. Generally speaking, such a conical sleeve may have an open top and bottom, wherein the bottom of such sleeve may be tapered, and thus comprise a smaller diameter than the open top. In so doing, it may be understood such a conical sleeve may provide sufficient volume near the top to ensure the floral grouping is not overly constrained, while remaining sufficiently tight at the bottom portion thereof to remain on the pot or a lower portion of the floral grouping during transport.

Typically, the production of conical sleeves for use as an outer protective cover for plants and other floral groupings generally involves the fusion of two sheets of paper stock that are bound together by use of an adhesive, thereby creating the sleeve itself. The method of manufacture of such a conical sleeve traditionally involves human labor due to the precision required in the fusion process. More specifically, in order to obtain a sufficiently conical shape through two sheets of paper stock, the adhesive used in connection therewith must be appropriately placed, and subsequently fused with such sheets of paper stock, in order to ensure the sealing effect provided thereby is strong enough to withstand transport and any stresses such seal may experience during the same. Accordingly, due to the requirements of precision, and the components and costs associated with obtaining such precision through automated machinery, the traditional and conventional methods of manufacture of conical sleeves often necessitates at least some degree of human labor.

An alternative method for creating such a conical sleeve instead comprises the use of a single sheet of paper stock. In such a method, the single sheet of paper stock may be precut to a trapezoidal shape, and subsequently folded diagonally to create the frustum of a cone. Once appropriately folded, an adhesive may be applied to the overlapping portions of such folded sheet to create the final conical sleeve. Once again, such a method requires precision, both in the folding of the single sheet of paper stock, and the application of an adhesive thereto.

As may be understood, such requirements for precision manufacturing result in a laborious and time-consuming process. Moreover, traditional human-based methods of manufacturing such conical sleeves can be unduly selective, as traditional machinery configured to allow a person to create such a conical sleeve may be difficult to operate for both untrained workers and those failing to possess certain physical qualities, such as sufficient height and/or strength. Specifically, typical adhesive applicator requires precise operation, at least in part because an inaccurate application of such an adhesive may not easily be rectified. Accordingly, those without adequate training, or the requisite height and/or physical strength, can find it difficult to meet such precise operation requirements. Indeed, due to the size of at least some conical sheets, such an adhesive applicator may be disposed out of reach for certain individuals, as the adhesive applicator must be configured to travel the entire length of such conical sleeve to ensure the adhesive is applied to the entirety of the length of the sheet of paper stock. Likewise, due to the sheer number of conical sheets which may need to be manufactured, and due to the speed of manufacturing required to achieve ideal efficiency in the manufacturing of same, fatigue may occur quickly, particularly in those individuals with less than ideal technique or physical attributes, thereby causing a reduction in efficiency.

Although the realm of automated conical sheet manufacturing machines may solve some of the foregoing problems, such realm is not without its own faults. For instance, such automated machinery are typically littered with a variety of moving parts, each of which must operate in precise coordination in order to ensure a proper conical sheet is formed therefrom. As such, maintenance of such machinery can be costly, as can the initial cost of producing same. Moreover, due to the excess number of moving parts, breakdowns of the machine occur more frequently, thereby causing downtimes in efficiency. Additionally, due to the number of moving parts, such machinery is commonly large, thereby taking up a substantial amount of warehouse space. As may be understood, the size of such machinery likewise causes a reduction in efficiency, as the inclusion of only one additional machine within a warehouse space may drastically increase the efficiency of the warehouse as a whole. Even further, due to the requirement the adhesive be applied to the entirety of the length of the sheet of paper stock, conventional automated systems utilize a moving applicator system, which can be inefficient due to the need for same to travel to-and-from an initial position and a terminal positon before a subsequent sheet of paper stock may be fully treated.

Accordingly, there is a need in the art which may allow for the efficient and accurate creation of conical sleeves. Such a solution should be configured to create sufficiently durable conical sleeves. Further, such a solution should be configured to allow for the creation of conical sleeves by unskilled operators, and should likewise enable those failing to possess the traditionally requisite physical traits to create the same. Moreover, it would be advantageous if such a solution were configured to enable the mass production of such conical sleeves, while likewise reducing the volumetric footprint of such a solution. In other words, such a solution should be configured to produce a plethora of conical sleeves at an efficient rate, while reducing the amount of area such a solution requires. In conjunction therewith, such a solution should seek to reduce the number of moving parts disposed therein, thereby reducing the initial production costs of such an assembly, while likewise reducing inefficiencies stemming from machinery breakdowns.

SUMMARY OF THE INVENTION

The present invention is designed to create conical paper plant sleeves of a specific size via a fully automated assembly. The focus of this invention is to increase the productivity in the manufacture of conical paper sleeves and to ensure a higher output during a predetermined timeframe, while assuring the output itself meets specified standards and requirements. The conical sleeves produced by the present assembly may be uniform in size and specification, although it is envisioned herein that conical sleeves of alternative sizes and specifications may likewise be produced thereby. At least one embodiment of the present invention utilizes a series of feeding rollers, folding guides and sensors that are monitored and actuated via a programmable controller that operates the motors and other electronics to assure a smooth transaction from start to completion. At least one embodiment of the present invention eliminates the need for manual interaction in the production of conical paper sleeves, although alternative embodiments utilizing at least a certain degree of manual interaction are likewise envisioned herein. Further, as will be discussed in greater detail below, at least one embodiment of the present invention may utilize a processor to control the operation of at least one, and in some instances a plurality of components of which the present invention is comprised.

More specifically, at least one embodiment of the present invention may comprise an automated sleeve production assembly configured to transform at least one, and, in some instances, a plurality of sheets of paper stock into a conical sleeve. Such an automated sleeve production assembly may generally comprise a folding table assembly, having a proximal end and a distal end, with an elongated surface disposed there between.

The proximal end of such folding table assembly may comprise a lift table assembly, which may be configured to house the sheet(s) of paper stock. As may be understood, because only a single sheet of paper stock may be formed into a conical sleeve at any given point in time, the lift table assembly may be configured to provide only one of such sheets of paper stock to the remaining portions of the folding table assembly at a time. As such, it may be understood the lift table assembly may be configured to iteratively and incrementally rise, such that a single sheet of paper stock is at a height that is level with the remaining portions of the folding table assembly at a time. In at least one embodiment of the present invention, the sheet(s) of paper stock to be used in connection with the folding table assembly may be precut, such as in a trapezoidal shape, although other shapes are envisioned herein. Further, in such an embodiment wherein the sheet(s) of paper stock are precut in a trapezoidal shape, it may be understood such sheet(s) of paper stock may be oriented such that the bases—i.e. the parallel sides—are perpendicular to the longitudinal axis of the folding table assembly.

Thus, in at least one embodiment of the present invention, such a lift table assembly may comprise a lifting platform, upon which the sheet(s) of paper stock may be disposed. Such lifting platform may be operatively disposed in connection with an actuator, which may be configured to move such lifting platform along a vertical axis. Further disposed in connection with such a lifting platform and such actuator may be a level switch, which may identify when the level platform is disposed at the correct vertical position, and thus control the operation of the actuator.

Further disposed in connection with such a lifting table assembly may be a lift feed roller. Such a lift feed roller may comprise one, or in some instances a plurality of rollers and/or other like components configured to rotate or otherwise provide movement to the sheet(s) of paper stock disposed within the lifting table assembly, such as a belt. As may be understood, such lift feed roller may be configured to transmit a single sheet of paper stock from such lift assembly and onto the remaining portions of the folding table assembly. In other words, as the lift feed roller rotates, or otherwise imparts movement onto the single sheet of paper stock, such single sheet of paper stock may be withdrawn from lift table assembly and moved longitudinally along the remaining portions of the folding table assembly. Such a lift feed roller may be disposed in connection with a lift feed motor, which may configured to provide the applicable movement to the lift feed roller.

Once removed from the lifting table assembly, the sheet(s) of paper stock may be subsequently transferred longitudinally along the elongated surface of the folding table assembly and through a feed assembly. Generally speaking, in at least one embodiment of the present invention, such feed assembly may comprise a configuration of rollers, motors, and sensors configured to transmit such sheet(s) of paper stock along the lifting table assembly. More specifically, disposed near the proximal end of the lifting table assembly may be a first feed roller, which may comprise at least one, and in some instances a plurality of rollers or other like components configured to rotate or otherwise provide longitudinal movement to the sheet(s) of paper stock, such as through a belt. Akin to the lift table assembly, such first feed roller may be disposed in connection with a first feed motor configured to provide such rotation to the same.

Serially disposed in connection with the first feed roller may, in at least one embodiment of the present invention, be a sensor. Such sensor may be configured to identify the location of the sheet(s) of paper stock, and, through an electronic assembly disposed in connection therewith, and particularly through a processor disposed in connection with the sensor and the first feed motor, may further control the operation of the first feed roller, such that the sheet(s) of paper stock may be operatively disposed in the correct longitudinal location of the elongated surface.

Once disposed in the correct location, the sheet(s) of paper stock may then be subjected to a first folding assembly, which may comprise at least one first fold guide. Such first fold guides may be configured to apply a first fold to the sheet(s) of paper stock, thereby forming a first folded sheet. During the operation of the first fold guides, contact rollers may be employed to ensure the sheet of paper stock maintains contact with the folding table assembly, and components disposed thereon, such as the first feed roller. In at least one embodiment of the present invention, such first fold may comprise an angle substantially equal to 180 degrees, and may be disposed at an operative distance from one edge and/or vertex of the sheet of paper stock. In at least one embodiment, such an operative distance may comprise a line of symmetry of the sheet of paper stock, such that the edge and/or vertex of the first fold are substantially coincident with such line of symmetry. As may be understood, alternative angles, orientations, and operative distances are envisioned herein. Further, as may be understood, the term "substantially," as used herein, is merely meant to refer to standards of error and other tolerances known by those having skill in the art.

In at least one embodiment of the present invention, such a first folded sheet may subsequently proceed along the elongated surface of the folding table assembly via a second feed roller which, as before, may comprise one roller, a plurality thereof, or some other like component configured to apply longitudinal movement to the first folded sheet via the movement thereof, such as a belt. Once again, as before, such second feed roller may be disposed in connection with a second feed motor configured to apply such pertinent movement to the same.

While traveling along the second feed roller, the first folded sheet may, in at least one embodiment of the present invention, encounter an adhesive applicator assembly. Such an adhesive applicator assembly may be disposed above the elongated surface of the folding table assembly, and the various components thereof. Such an adhesive applicator assembly may comprise an applicator disposed in fluid communication with at least one applicator tank. As may be understood, such applicator tank may house an adhesive, such as glue. Accordingly, it may be understood the adhesive disposed within such applicator tank may be configured to be expelled out of the applicator, such as through a pump, which may be controlled by a processor in at least certain embodiments of the present invention.

In at least one embodiment of the present invention, such adhesive applicator assembly may be configured to apply the adhesive onto the first folded sheet. As such, the applicator may be operatively oriented to ensure the adhesive is correctly applied onto the first folded sheet, without the risk of misapplication thereof onto any of the various components of the folding table assembly. In certain embodiments of the present invention, the applicator may be operatively oriented to apply the adhesive at an operative location that is at least substantially coincident with a line of symmetry of each sheet of paper stock. In so doing, it may be understood the adhesive may applied onto the first fold in at least one embodiment of the present invention.

Further, in at least one embodiment of the present invention, it may be understood the adhesive applicator assembly may be configured to operate in conjunction with the second feed roller and second feed motor. In other words, in such an embodiment, the second feed roller may be configured to continue longitudinally transmitting the first folded sheet along the folding table assembly whilst the adhesive applicator assembly applied the adhesive onto the first fold. In so doing, it may be understood the adhesive applicator assembly, and more particular the applicator itself, may remain static, as the longitudinal movement of the first folded sheet may enable the applicator to apply an adhesive along the entire length thereof. As such, it may be understood the adhesive applicator assembly of such an embodiment of the present invention may result in greater efficiency, as such applicator need not shift from an initial position to a terminal position, before subsequently returning to the initial position. Accordingly, the manufacturing time for each conical sheet may be effectively reduced in such an embodiment.

Subsequent to the application of the adhesive onto the first fold, the first folded sheet may continue longitudinally traversing the folding table assembly until the first folded sheet reaches a second folding assembly. Much like the first folding assembly, such second folding assembly may comprise at least one second fold guide configured to apply a second fold to the first folded sheet, thereby forming a second folded sheet. Such second fold may apply to the edge and/or vertex opposite of the first fold, and may, in at least one embodiment of the present invention, comprise an angle substantially equal to 180 degrees, and may be disposed at an operative distance from the pertinent edge of the first folded sheet. In at least one embodiment, such an operative distance may comprise a line of symmetry of the sheet of paper stock, such that the edge and/or vertex of the second fold are substantially coincident with such line of symmetry.

As such, it may be understood the second fold may be disposed in overlapping relation with the first fold, such that the first fold and the second fold are operatively disposed in sandwiching relation to the adhesive. Accordingly, in this manner, it may be understood the adhesive may thus be applied in a manner that bonds the first fold and the second fold, which may occur coincident with a line of symmetry of the sheet of paper stock. Akin to the first folding assembly, the second folding assembly may, in certain embodiments, likewise comprise contact rollers configured to ensure the second folded sheet maintains sufficient contact with the folding table assembly, and the various components thereof, such as the second feed roller.

Once the first fold and the second fold are bonded through the adhesive applied there between, the second folded sheet may then pass through a crease assembly, which may be configured to apply pressure to the first fold and the second fold, and by extension the second folded sheet as a whole, thereby ensuring the first fold and the second fold are sufficiently bonded. Such a crease assembly may comprise a crease roller, used to apply force to the second folded sheet, and a crease motor, which may be configured to apply movement to the crease roller.

After passing through such crease roller, the second folded sheet may then be disposed at the distal end of the folding table assembly. Disposed at such distal end may be a receptacle, which may be configured to receive the second folded sheet, and any further second folded sheets set to follow thereafter. As may be understood, the second folded sheet which may be received by the receptacle may thus comprise a conical sheet, or an at least flattened orientation thereof, which may be subsequently disposed about a plant or other floral arrangement.

In conjunction with the foregoing, at least one embodiment of the present invention may further comprise a folding table assembly having an operator console disposed thereon. Such operator console may be disposed in connection with a processor, which may be disposed in connection with a memory having computer-readable instructions disposed thereon. Such processor may itself be connected to the various components of the folding table assembly. Accordingly, it may be understood such operator console may be configured to enable an operator of the folding table assembly to control the various components and/or systems of the same, or to otherwise turn off the production of the same.

Further envisioned herein is yet an additional embodiment of a system, assembly, or machine configured to enable the efficient production of a conical sleeve from a sheet of paper stock. More specifically, such an additional embodiment may instead comprise a manual adhesive applicator system. Such a manual adhesive applicator system may be configured to be manually operated by an operator thereof. Accordingly, in contrast to the other embodiments envisioned herein, such manual adhesive applicator system may be cheaper to manufacture, and likewise less costly to repair, due to a reduction in the number of components disposed therein.

More specifically, such an embodiment of a manual adhesive applicator system may comprise a frame assembly, which may be itself comprised of extruded aluminum. Such frame assembly may be configured to hold the various components of such manual adhesive applicator system, whether disposed thereon or therein. For instance, such frame assembly may comprise a table, upon which the sheet(s) of paper stock may be disposed. For instance, such a table may have at least one sheet repository disposed thereon, which may be configured to house the sheet(s) of paper stock for easy manipulation thereof by an operator of such manual adhesive applicator system. As may be understood, such a sheet repository may be configured to hold one sheet of paper stock, or a plurality thereof. In an embodiment wherein the sheet repository can hold a plurality of sheets of paper stock, it may be understood such a sheet repository may be configured to enable an operator to manipulate a single sheet of paper stock at a time, for the purposes of forming such sheet of paper stock into a conical sleeve, before the subsequent withdrawal thereof. Accordingly, it may be understood such a sheet repository may further be configured for the easy withdrawal of a single sheet of paper stock therefrom.

Operatively disposed in connection with such table may comprise a folding assembly. In at least one embodiment of the present invention, such a folding assembly may comprise a folding element. Such a folding element may comprise, for instance, at least one folding guide, which may be configured to allow an operator to fold a single sheet of paper stock about same, thereby enabling the operator to easily and accurately create a first fold and/or a second fold at, for instance, a location coincident with a line of symmetry of the table. In other words, such a folding element may comprise a structure about which a sheet of paper stock may be folded such that a first fold and a second fold may be disposed in overlapping relation at a location coincident with a line of symmetry of the table. As may be understood, such a folding element may comprise a variety of sizes and shapes, and, as such, may be configured to be removably attached to such table. For instance, in at least one embodiment of the present invention, such a folding element may be removably attached to the table via at least one folding column, which may be disposed through such folding element and into the table, thereby ensuring such folding element remains securably affixed to the table during the operation thereof. Moreover, it may be understood the folding element of such an embodiment may thus be removed and replaced by simply removing the folding column(s) from the table.

However, alternative embodiments of such a folding element are envisioned herein. For instance, one alternative embodiment of such a folding element may instead comprise at least one separate hinged or door component configured to be lifted up from the table and folded at an angle of 180 degrees. As such, it may be understood when a sheet of paper stock is disposed on the table, an operator may individually use the two hinged components to create a first fold and a second fold, such as those recited above, wherein such first fold and such second fold may be configured in at least one embodiment to overlap along a line coincident with a line of symmetry of the sheet of paper stock. As may be understood, such folding element, and thus by extension each of the two hinged components, may instead be distinct and separate from the table, such that such folding element may be removed from the same and/or affixed thereto via fasteners or other like connector components. In such an embodiment, such a folding element may be configured to apply a fold to one sheet of paper stock, or a plurality of same, at a given time. For instance, such a folding element may be configured to apply a first fold to a plurality of sheets of paper stock at one time.

Further, such an embodiment of a manual adhesive applicator system may additionally comprise an adhesive applicator assembly, wherein such adhesive applicator assembly may be configured to apply a certain amount of adhesive to the sheet of paper stock. Such an adhesive applicator system may be attached to the frame assembly at, for instance, an overhead beam thereof, thereby disposing such adhesive applicator system at a location vertically above such table, thereby enabling the adhesive applicator assembly to apply such certain amount of adhesive from an advantageous position. As in other embodiments of the present invention, the adhesive may be applied between the first fold and the second fold of the sheet of paper stock. Likewise, as in other embodiments envisioned herein, such adhesive applicator system may comprise an applicator disposed in connection with an applicator tank. In at least one embodiment, such applicator tank may be sufficiently large in size to reduce instances of refilling. Further, such applicator tank may be pressurized and controlled via an adjustable pressure regulator to further reduce instances of refilling.

In at least one embodiment of the present invention, such an adhesive applicator assembly may be configured to automatically apply the adhesive to the sheet of paper stock. Specifically, such an adhesive applicator assembly may be configured and adjusted in order to apply a certain amount of adhesive to a predetermined location. Such a predetermined location may, in at least one embodiment, comprise a predetermined route, such that the adhesive applicator assembly may be configured to travel along such a predetermined route whilst applying adhesive along the same. As such, the adhesive applicator assembly of at least one embodiment of the present invention may comprise certain components configured to enable the same to travel to a predetermined location or along a predetermined route.

For instance, in at least one embodiment of such an adhesive applicator assembly, the applicator may be disposed in connection with an applicator motor. Such an applicator motor may comprise, for instance, a step motor, wherein such step motor may be configured using a programmable logic controller to enable the applicator to rotate. Likewise, such a step motor may be configured using 4-20 milliamp control to coordinate motor travel adjustment.

Additionally, such an applicator assembly may further comprise the applicator disposed in connection with an applicator arm and an applicator arm track. As such, it may be understood such applicator motor may be configured to enable the applicator to move in at least one degree of freedom, such as longitudinally along the applicator arm and/or the applicator track, thereby enabling the applicator to change positions along the table. Further, it should be noted such applicator arm may instead be configured to enable the applicator to rotate in at least one degree of freedom, thereby enabling such applicator to apply a certain amount of adhesive along a predetermined route without the need to actually transverse such predetermined route itself.

Moreover, such an applicator may comprise a variable orifice, such that the amount of adhesive expelled therefrom at a given instant may be adjusted. Moreover, in connection with an embodiment wherein the applicator tank is pressurized, the applicator may further be configured to apply only a certain amount of adhesive when traveling along a certain portion of the predetermined route.

In conjunction with the foregoing, such an adhesive applicator assembly may additionally comprise certain components configured to enable for the mechanical adjustment of the applicator, thus allowing the fine tuning of the applicator's travel, route, and height. For instance, such adhesive applicator assembly may be disposed in connection with an electronic assembly. Such an electronic assembly may comprise an operator console, which may enable a user to make at least some of the foregoing adjustments to the manual adhesive applicator system. Such an operator console may comprise a processor disposed in connection with a memory, with computer-readable instructions disposed thereon which may be configured to enable such foregoing adjustments for the manual adhesive applicator system. Even further, such an electronic assembly may further comprise, for instance, a pedal switch, or some other like component configured to enable the operator to control the operation of the adhesive applicator assembly itself, thereby giving the operator full control over the moment a certain amount of adhesive is applied to the first fold of a given sheet of paper stock.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
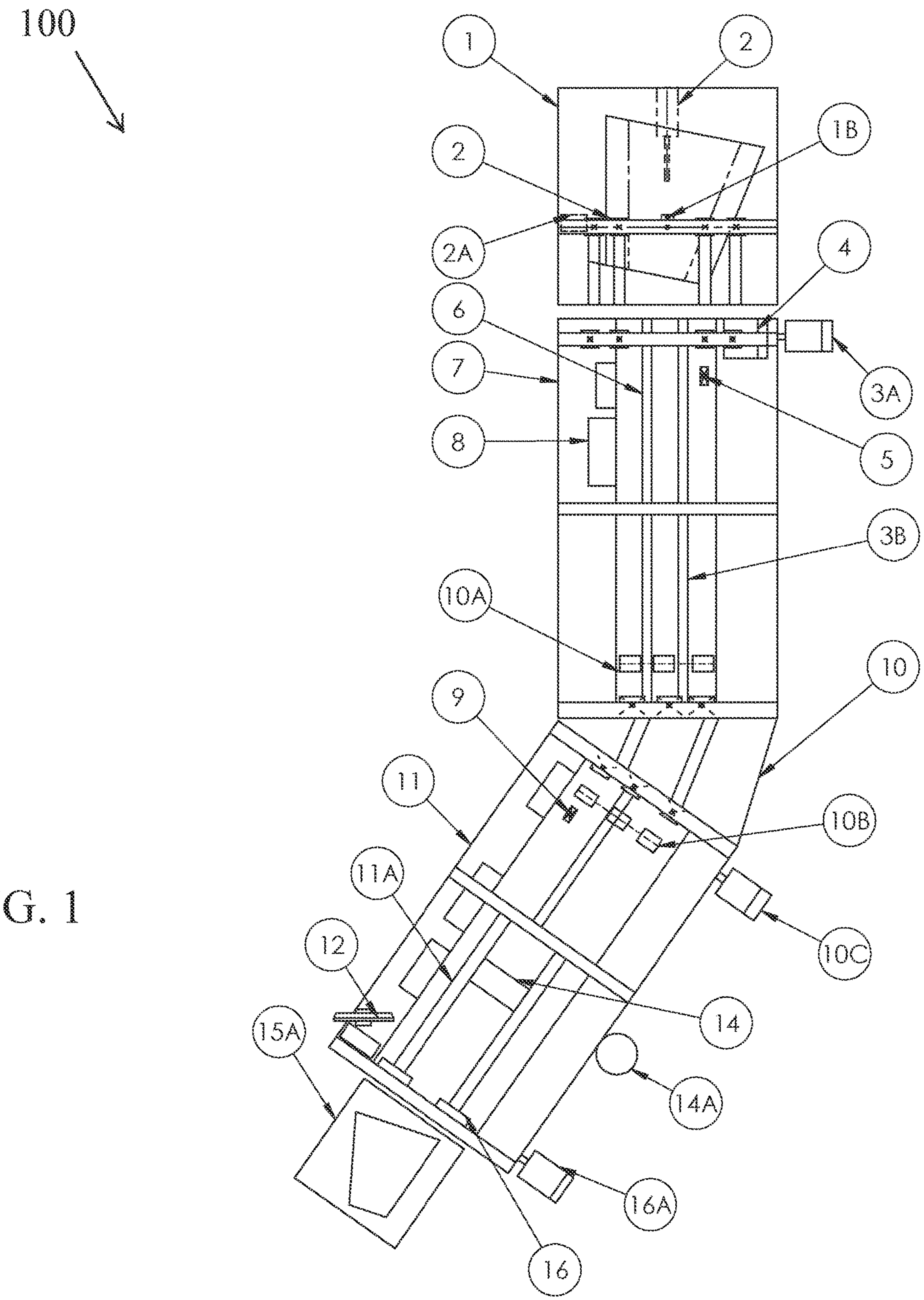
FIG. 1 is a top plan view of one illustrative embodiment of an automated plant sleeve production assembly in accordance with the present invention.

FIG. 1 is illustrative of one illustrative embodiment of an automated plant sleeve production assembly 100 in accordance with the present invention. The assembly 100 originates at a lift table 1 and terminates at a receiving basket 15A.

The present assembly 100 is utilized to automate the process of producing plant paper sleeves, such as, by way of example, from Kraft paper stock, thereby increasing productivity while insuring the sleeves produced meet standard criteria. For purposes of illustrating the assembly 100, as an initial matter, the paper stock is precut into a trapezoidal shape. FIG. 1 is illustrative of one embodiment of the components of the present assembly 100.

Once paper stock is precut into a trapezoidal shape, the precut paper stock is placed on a lift table 1 in a stack. The lift table 1 may comprise a scissor-type mechanism, activated by either an electrical or hydraulic system. An actuator (not shown) is controlled by a level switch 1B to maintain the proper height and insure an uninterrupted supply of precut sheets as the stock is consumed. The trapezoidal precut sheets are placed on the lift table 1, and, in at least one embodiment, the lift table 1 is placed at an angle proportional to the taper of a first fold of the precut sheet, and the precut sheets are fed into the process by soft rubber feeding rollers 2. The feeding rollers 2, driven by an electrical motor 2A, take the top precut sheet from the lift table 1 and transfer it onto a first table 7.

As each precut sheet is transferred to the first table 7, a sensor 5 is triggered, activating incoming rollers 4 while releasing the feeding rollers 2 from the surface of the stack. The first table 7 has a rectangular configuration with belts driven by an electrical motor 3A. The belts assist the precut sheet in traveling along the first table 7 for the folding process.

While the precut sheet travels along the first table 7, there are one or more folding guides 6 that form a first 180 degree angle fold. The top roller belts and metal bands 3B maintain the precut sheet in contact with bottom belts. The precut sheet then travels to the end of the first table 7, and in at least one embodiment, engages a transfer section 10. The precut sheet is assisted by a series of rollers 10A, 10B.

The transfer section 10 utilizes the lifting rollers 10A on the first table 7 and the lifting rollers 10B on a second table 11. The second table 11 includes a motor 10C and connects to the first table 7 at an angle proportional to the taper of the frustum cone shape of the second fold of the final product. As the precut sheet, already folded on one side, exits the first table 7, it is assisted by the rollers 10A and will reach a sensor 9 on the second table 11. At this point, the lifting rollers 10B on the second table 11 will engage the precut sheet, while the rollers 10A on the first table 7 simultaneously release the precut sheet, creating a smooth and controlled transfer.

As the half folded precut sheet travels along the second table 11, folding guides 11A will assist in making a second 180 degree fold to complete the final shape of the sleeve. While the second fold is in process, an adhesive is applied to the first fold overlap. The adhesive, in one embodiment, is applied from an air pressurized adhesive tank 14A by way of the electro-pneumatic adhesive applicator 14. The adhesive applicator 14 is displaced in a manner that coincides with a line of symmetry of each precut sheet. In accordance with at least one embodiment, the adhesive applicator 14 moves transversely to the second table 11 in a controlled manner while applying an amount of adhesive.

The newly created paper sleeve reaches the end of the second table 11, passing a set of creasing rollers 16 that operate off a motor 16A. The force of the creasing rollers 16 flatten the final product, and the final product is ejected by the creasing rollers 16 into the receiving basket 15A, where it is later removed.

The operation of the present assembly 100 is monitored via data acquisition unit 12. A programmable controller 8 comprises algorithms to precisely control the timing of the application of adhesive with the transport of each precut sheet through the adhesive applicator 14, thereby applying a precise amount of adhesive to each precut sheet as it passes through the adhesive applicator 14. The application of adhesive is immediately followed by the precut sheet traveling through folding guides 11A on the second table, and then through the creasing rollers 16, to create the final conical paper plant sleeve.

Figure 2:
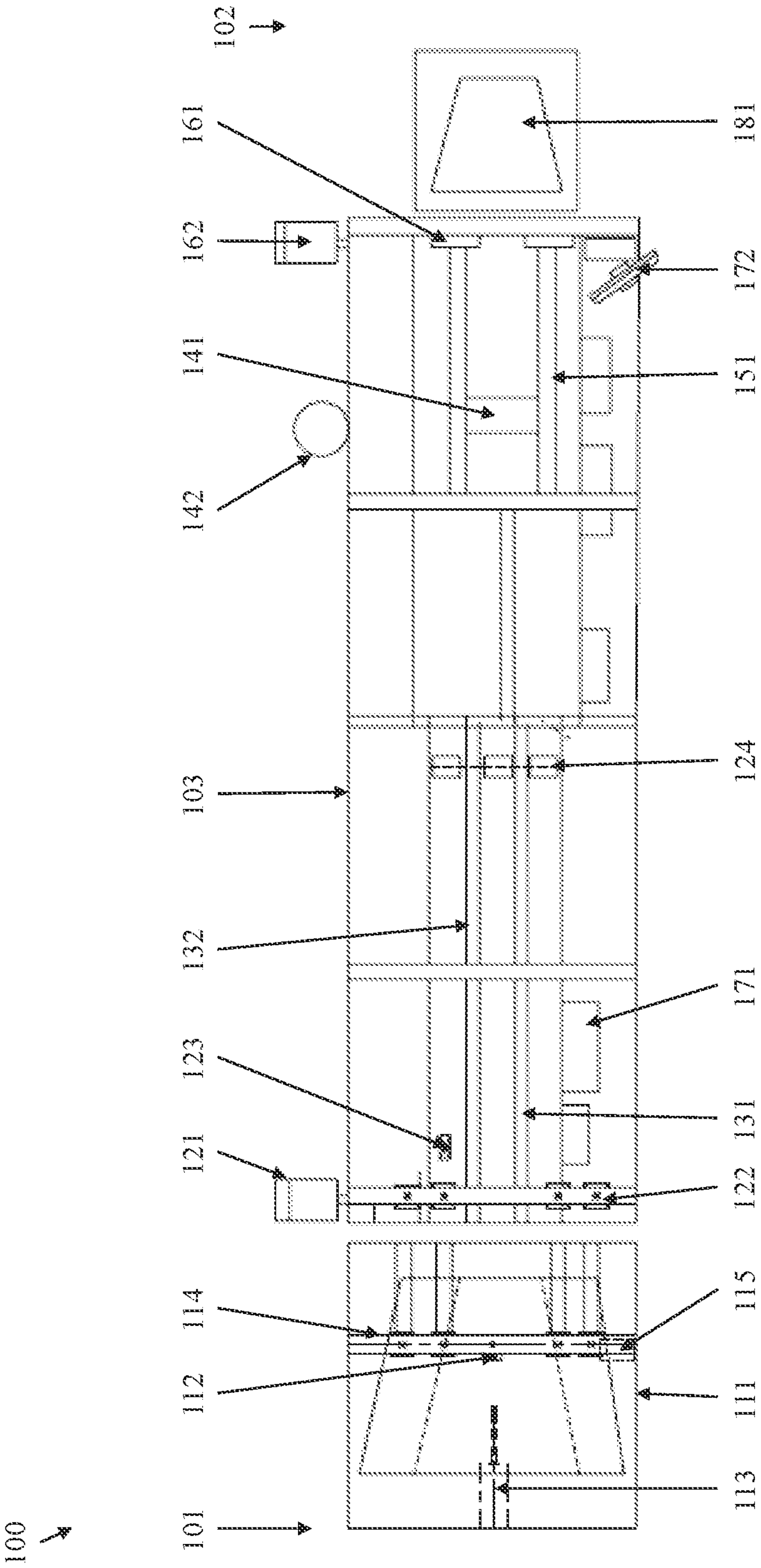
FIG. 2 is a top plan view of a folding table assembly in accordance with at least one embodiment of the present invention.

An additional embodiment of the present invention may be seen with reference to FIG. 2. There, it may be seen such an embodiment may comprise, in contrast to the embodiment depicted in FIG. 1, only a single table disposed along a single longitudinal axis. Thus, as may be understood, the embodiment depicted in FIG. 2 may therefore, in at least some instances, have greater floor space economy, thereby occupying less space within a given warehouse in which such embodiment is disposed, and thus possibly enabling the operator of such warehouse to dispose additional such embodiments of the present invention therein.

Specifically, the embodiment depicted in FIG. 2 may comprise an automated sleeve production assembly comprising a folding table assembly 100, which may be configured to transform at least one, and in some instances a plurality of sheets of paper stock into a conical sleeve. Such folding table assembly 100 may comprise a proximal end 101 and a distal end 102 with an elongated surface 103 disposed there between.

At the proximal end 101 of such folding table assembly 100 may be a lift table assembly, which may be configured to house the sheet(s) of paper stock, and iteratively transport a single sheet of such paper stock onto the folding table assembly 100. More specifically, in an embodiment wherein the lift table assembly houses a plurality of sheets of paper stock, such lift table assembly may be configured to iteratively provide a single sheet of such paper stock onto the folding table assembly 100 at a given point in time. As such, it may be understood the lift table assembly may be configured to incrementally shift in a vertical manner, thereby providing a single sheet of paper stock at a height level with the elongated surface 103 of the folding table assembly 100.

More specifically, such a lift table assembly may comprise a lifting platform 111, upon which the sheet(s) of paper stock may be disposed, which may be configured to provide the aforementioned vertical iterative movement. As such, the lifting platform 111 may be operatively disposed in connection with an actuator 113, which may be configured to move the lifting platform along a vertical axis. Disposed in connection with such actuator 113 may be a level switch 112, which may identify when the lifting platform 111 is disposed at the correct vertical position, and thereby control when the actuator 113 provides such vertical movement to the lifting platform 111.

As previously stated, the sheet(s) of paper stock may be operatively disposed on the lifting platform 111 dependent upon the folding and shaping processes of the same. As may be understood, such folding and shaping processes may be dependent upon the size and/or shape of the sheet(s) of paper stock before such sheet(s) of paper stock are provided onto the folding table assembly 100. Accordingly, in at least one embodiment of the present invention, wherein the sheet(s) of paper stock are precut into a trapezoidal shape, such sheet(s) of paper stock may be oriented on the lifting platform 111 such that the bases, or in other words the parallel sides of such sheet(s) of paper stock, are orthogonal to the longitudinal axis of the folding table assembly 100. Accordingly, in such an embodiment, it may be understood the sheet(s) of paper stock are fed in a straight manner onto the folding table assembly 100.

Further, in at least one embodiment of the present invention, the lift table assembly may further comprise at least one lift feed roller 114, or alternatively a plurality thereof, which may be configured to withdraw a single sheet of paper stock from the lifting platform 111 and transport the same onto the elongated surface 103 of the folding table assembly 100. Such a lift feed roller may comprise, for instance, a roller, a belt, or some other component configured to provide the foregoing movement of the sheet of paper stock. Disposed in connection with such lift feed roller 114 may be a lift feed motor 115, which may be configured to provide, for instance, rotational movement to the lift feed roller 114. As may be understood, such lift feed motor 115 may be configured to provide some other type of movement to the lift feed roller 114 dependent upon the type of lift feed roller 114 used, of which a variety of types are envisioned herein.

With further reference to FIG. 2, it may be seen the sheet of paper stock withdrawn from the lift table assembly may be subsequently transferred onto the elongated surface 103 of the folding table assembly 100, wherein such sheet of paper stock may subsequently enter a feed assembly. Such a feed assembly may comprise, for instance, a configuration of a variety of rollers, motors, sensors, belts, and other like components configured to transmit such sheet of paper stock from the proximal end 101 of the folding table assembly 100 to the distal end 102 thereof.

For instance, such feed assembly may comprise a first feed roller 122 disposed near the proximal end 101 of the folding table assembly 100. Such first feed roller 122 may be disposed in connection with a first feed motor 121 which may be conjunctively configured to transmit the sheet of paper stock along the folding table assembly 100. Additionally, such first feed roller 122 and first feed motor 121 may be further disposed in connection with a sensor, which may be configured to identify the location of the sheet of paper stock, and thus may be configured to exert control over the first feed motor 121, thereby enabling such sheet of paper stock to be operatively disposed in the correct location along the longitudinal axis of the folding table assembly 100.

Once disposed in such correct location, the sheet of paper stock may be subjected to a first folding assembly, which may comprise at least one first fold guide 131. Such first fold guides 131 may be configured to apply a first fold to the sheet of paper stock, thereby forming a first folded sheet. In at least one embodiment of the present invention, such first fold may comprise an angle substantially equal to 180 degrees, and may be disposed at an operative distance from one edge and/or vertex of the sheet of paper stock, wherein such operative distance may be disposed to place such edge and/or vertex at a location substantially coincident with a line of symmetry of the sheet of paper stock. In other words, such first fold, in at least one embodiment of the present invention, may be configured so as to place the edge, or a vertex, of the sheet of paper stock, or at least a portion thereof, at the line of symmetry of such sheet of paper stock. However, alternative embodiments of the present invention may comprise alternative angles, orientations, and operative distances, such that the first fold is configured to instead place the edge or vertex of the sheet of paper stock at an alternative location. For instance, such first fold may be disposed parallel to the longitudinal axis of the elongated surface 103, or alternatively at an angle thereto. As used herein, the term "substantially" merely refers to standards of error or other tolerances as known by those having skill in the art.

Further, in at least one embodiment of the present invention, such a folding assembly may additionally comprise at least one, and in some instances a plurality of contact rollers 133. Such contact rollers 133 may, in some embodiments, span the entire length of the elongated surface 103, or may alternatively only span a portion thereof. Such contact roller 133 may operate to ensure the sheet of paper stock maintains contact with the elongated surface 103, or any other components disposed thereon, throughout the creation of the first fold. Accordingly, such contact rollers 133 may comprise rollers, a belt, or any other like component configured to maintain such contact between the sheet of paper stock and the elongated surface 103 and/or folding table assembly 100.

With continued reference to FIG. 2, such folding table assembly 100, and more particularly the feed assembly, may comprise a second feed roller 124 configured to apply longitudinal movement to the sheet of paper stock after same has been transformed into a first folded sheet by the first folding assembly, and, more specifically, the first fold guides 131. Accordingly, such second feed roller 124 may be disposed at a more distal portion of the elongated surface 103 than the first feed rollers 122, and the first fold guides 131. Once again, such second feed roller 124 may comprise a roller, a belt, or any other like component configured to provide such movement to the first folded sheet, and may comprise one such component, or a plurality thereof. Further, such second feed roller 124 may be disposed in connection with a second feed motor, configured to provide such movement.

In at least one embodiment of the present invention, the first folded sheet may subsequently encounter an adhesive applicator assembly, which may be configured to apply a certain amount of adhesive onto the same. As shown in the embodiment depicted in FIG. 2, such adhesive applicator assembly may comprise an applicator 141 disposed in fluid communication with an applicator tank 142, which may house the pertinent adhesive, such as glue. Moreover, in such an embodiment, the applicator 141 may be disposed at an operative height above the folding table assembly 100, and thus the elongated surface 103 thereof, thereby enabling such applicator 141 to apply the adhesive to the first folded sheet while the same transmits across the elongated surface 103 via the second feed roller 124. More specifically, such adhesive may be fluidly communicated from the applicator tank 142 to the applicator 141, such as through a pump, for expulsion therefrom.

Further, as previously stated, because the applicator 141 may be configured to apply the adhesive to the first folded sheet while the same is transmitted longitudinally along the elongated surface 103 of the folding table assembly 100, it may be understood such applicator 141, in at least one embodiment of the present invention, may be configured to remain stationary, and may be operatively oriented to apply the adhesive coincident with a line of symmetry of the sheet of paper stock, and thus onto the first fold. In this manner, it may be understood such adhesive may be applied along a consistent line of such first folded sheet, without the need for the applicator 141 to be moved along such line, thereby increasing the efficiency of the folding table assembly 100 as a whole.

With further reference to FIG. 2, it may be seen at least one embodiment of the present invention may further comprise a folding table assembly 100 having a second folding assembly, which itself may comprise at least one second fold guide 151. Such second fold guides 151 may be disposed more distally than the applicator 141, such that the first folded sheet will be transmitted onto the second fold guides 151 only after the adhesive has been applied thereto. Much like the first fold guides 131, the second fold guides 151 may be configured to apply a second fold to the first folded sheet, thereby forming a second folded sheet. Such second fold may be applied to the edge opposite of the first fold. In at least one embodiment of the present invention, such second fold may comprise an angle substantially equal to 180 degrees, and may be disposed at an operative distance from the edge and/or vertex of the first folded sheet. For instance, such operative distance may comprise an amount sufficient for the edge and/or vertex of the second fold to be substantially coincident with a line of symmetry of the sheet of paper stock. Once again, the first fold may be disposed parallel to the longitudinal axis of the elongated surface 103, or alternatively at angle thereto.

Accordingly, it may be understood at least one embodiment of the present invention may be configured to form a second fold in overlapping relation with the first fold, such that the first fold and the second fold are operatively disposed in sandwiching relation relative to the adhesive. Accordingly, in this manner, it may be understood the adhesive may thus may applied in a manner that bonds the first fold and the second fold, which may occur coincident with a line of symmetry of the sheet of paper stock, although alternative bond locations of the first fold and the second fold are envisioned herein.

Akin to the first folding assembly, the second folding assembly in accordance with at least one embodiment of the present invention may also comprise contact rollers 132. Such contact rollers 132 may be the same as the ones disposed in connection with the first folding assembly, or may alternatively comprise a distinct structure. Notwithstanding, such contact rollers 132 may likewise be configured to maintain sufficient contact between the second folded sheet and the elongated surface 103, and the various components disposed thereon, throughout the folding process.

In at least one embodiment of the present invention, such as the one depicted in FIG. 2, such folding table assembly 100 may further comprise a crease assembly disposed near the distal end 102 thereof. Such crease assembly may be configured to apply pressure to the overlapping first fold and second fold, thereby ensuring the first fold and the second fold are sufficiently bonded through the adhesive applied there between. Such a crease assembly may comprise, for instance, a crease roller 161, which may apply such pressure to the first fold and the second fold, and possibly the entirety of the second folded sheet. Akin to the other roller components of the present invention, such crease roller 161 may be disposed in connection with a crease motor 162.

Additionally, such crease roller 161 may comprise a roller, a belt, or any other like component configured to apply pressure to the first fold and the second fold.

At least one embodiment of the present invention may additionally comprise a receptacle 181, which may be disposed at a distal end 102 of the folding table assembly 100. Such receptacle 181 may be configured to receive one second folded sheet, or a plurality thereof. As may be understood, the second folded sheet may comprise a conical sheet, or a flattened version thereof, once disposed into the receptacle 181.

In conjunction with the foregoing components of the folding table assembly 100, it may be understood at least one embodiment of the present invention may further comprise an operator console 181 disposed in connection with a processor 182, both of which may be communicably configured with at least some of the remaining portions of the folding table assembly, such as the level switch 112, actuator 113, lift feed rollers 114, and lift feed motor 115 of the lift table assembly, the first feed motor 121, first feed rollers 122, sensor 123, second feed rollers 124, and second feed motor 125 of the feed assembly, the applicator 141 and applicator tank 142 of the adhesive applicator assembly, and other like components configured to move in connection with the various other components. As such, it may be understood the operator console 181 may provide an operator of the machinery the ability to control various components of the folding table assembly 100, and thus the operation thereof. Such operator control may be then be processed and communicated to the various components of the folding table assembly 100 through the processor 182. Likewise, the operation of the various components may be processed by the processor 182, and subsequently communicated to the operator console 181, thereby providing information to the operator of the folding table assembly

100. As may be understood, such operator console 181 may comprise, for instance, a graphic user interface configured in input-output relation with such processor 182, thereby enabling the operator to visually see the information provided by the various components, and to make changes and/or issue instructions thereto.

Figure 3:
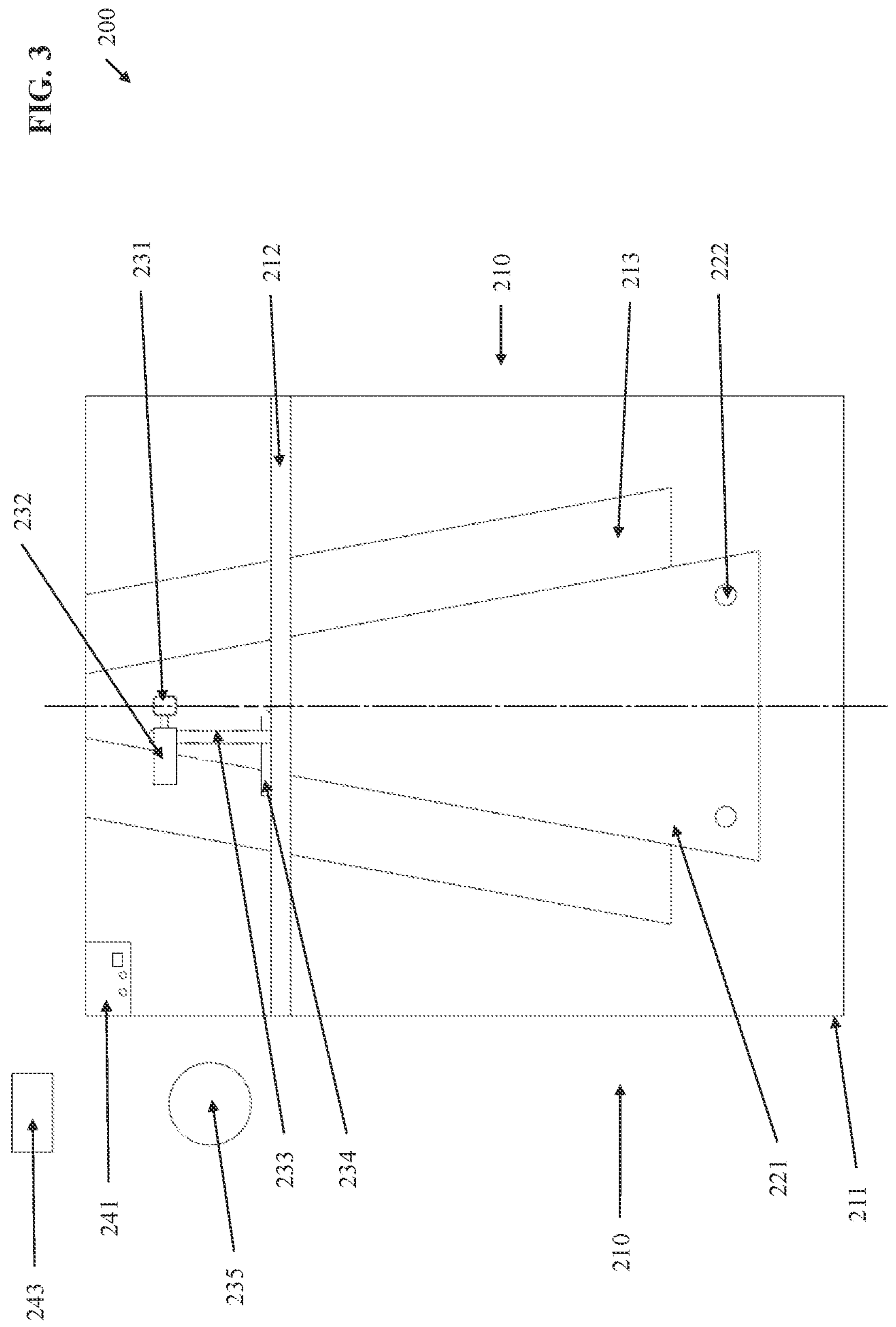
FIG. 3 is a top plan view of a manual adhesive applicator system in accordance with at least one embodiment of the present invention.

As depicted in FIG. 3, an additional embodiment of the present invention may comprise a manual adhesive applicator assembly configured to enable the efficient production of a conical sleeve from a sheet of paper stock through semi-manual means. In other words, such a manual adhesive applicator assembly may utilize at least some degree of human labor, in connection with a certain amount of automated processes, thereby providing an easier and more efficient system through which manual labor may be used to create a conical sleeve from a sheet of paper stock.

More specifically, as may be seen with reference to FIG. 3, such an embodiment of a manual adhesive applicator system 200 may comprise a frame assembly 210, which may itself be comprised of extruded aluminum. As previously stated, such frame assembly 210 may be configured to hold various components of such manual adhesive applicator system 200.

For instance, in the embodiment depicted in FIG. 3, such frame assembly 210 may comprise a table 211, which may comprise, for instance, a raised elongated surface configured to hold various components thereon. Such a table 211 may comprise, for instance, some material configured to be durable, resistant to rust, and from which adhesives such as glue and the like may be easily cleaned. As previously stated, such a table 211 may be configured for the disposition of sheet(s) of paper stock thereon. For instance, such a table 211 may comprise a sheet repository 213, which may configured to house one sheet of paper stock, or a plurality thereof. Such a sheet repository 213 may be built into the table itself, or may instead simply comprise some removable component which may be easily removed from the table. As may be understood, such a sheet repository 213 may be configured in a variety of shapes and sizes to accommodate any kind of sheet(s) of paper stock now known or hereafter developed.

As previously stated, such a sheet repository 213 may be configured to enable an operator to manipulate a single sheet of paper stock at a time, thereby enabling such an operator to apply a first fold and a second fold thereto, before the subsequent withdrawal of such single sheet of paper stock therefrom. Thus, it may be understood the sheet repository 213 of at least one embodiment of the present invention may comprise a divider component configured to separate a single sheet of paper stock from the remaining sheets thereof, thereby enabling an operator to easily manipulate a single sheet of paper stock at a given time.

With continued reference to FIG. 3, such a table 211 may be disposed in connection with a folding assembly. Such a folding assembly may comprise, for instance, a folding element 221 which may itself comprise, for instance, at least one folding guide. Such a folding element 221 may be configured to enable an operator to fold a sheet of paper stock thereabout, and thus may comprise a shape disposed to enable the operator to apply a first fold and a second fold to the sheet of paper stock at an operative distance from at least one edge of the table 211. As may be understood, in at least one embodiment of the present invention, such a folding element 221 may be disposed vertically above the sheet repository 213. For instance, in at least one embodiment of the present invention, such a folding element 221 may be configured to apply a first fold and a second fold in overlapping relation at an operative distance substantially coincident with a line of symmetry of the table. As may be understood, the term "substantially" as used herein, is merely meant to refer to standards of error and other tolerances known by those having skill in the art. Further, as may be understood, alternative operative distances and locations of the first fold and/or the second fold are envisioned herein.

However, as may be understood, because the manual adhesive applicator assembly 300 of at least one embodiment of the present invention may be configured to be used in connection with a plurality of different types of paper stock, and thus for the creation of conical sleeves of varying shapes and sizes, it may be understood the folding assembly 220 of at least one embodiment of the present invention may itself come in various shapes and sizes. As such, in at least one embodiment of the present invention, such a folding assembly 220, or at least the folding element 221 thereof, may be removably attached to the table 211. In other words, it may be understood such a folding element 221 may be securably affixed to the table 211 through some means which themselves may be removable, thereby enabling an operator to change the folding element 221 attached to such table 211 at will.

For instance, in the embodiment depicted in FIG. 3, such folding element 221 may be disposed in connection with the table 211 through at least one folding column 222. Thus, it may be understood such at least one folding column 222 may be configured to pass through the folding element 221 for attachment with the table 211. Thus, it may be understood the folding element 221 of at least one embodiment of the present invention may have at least one aperture disposed thereon, through which the at least one folding column 222 may be disposed. Further, it may be understood such table 211 may likewise have at least one recess disposed thereon, which may be configured to house the at least one folding column 222. Alternatively, it may be understood such a table 211 may instead have a bracket, mount, joist, or some other component which may be configured to securably hold such at least one folding column 222.

However, as previously stated, alternative embodiments of such a folding element 221 are envisioned herein. For instance, one alternative embodiment of such a folding element 221 may instead comprise at least one hinged or door component configured to be lifted from the table and folded at an angle of 180 degrees. Accordingly, it may be understood such an embodiment of the present invention may be configured such that the sheet repository 213 is disposed vertically above the folding element 221, such that the folding element 221 may be lifted upwards and, in so doing, apply a first fold to the sheet of paper stock disposed on such sheet repository 213.

In such an embodiment, it may be understood such a folding element 221 may be configured to apply a first fold to at least one sheet of paper stock. For instance, such a folding element 221 may be configured to apply a first fold to a plurality of sheets of paper stock, such as the entire amount of sheets of paper stock disposed on such sheet repository 213. In so doing, it may be understood efficiency may be enhanced in at least certain such embodiments, as an operator need only make one movement to fold a plurality of sheets of paper stock. In such an embodiment, it may be understood such folding element 221 may further comprise, for instance, the aforementioned at least one fold guide, which may be configured to individually apply a second fold to each sheet of paper stock once a certain amount of adhesive has been applied thereon.

With continued reference to FIG. 3, it may be seen at least one embodiment of the present invention may further comprise an adhesive applicator assembly configured to apply a certain amount of adhesive to the sheet of paper stock. Such an adhesive applicator assembly may be attached to the frame assembly 210 through, for instance, an overhead beam 212, thereby disposing such adhesive applicator assembly at a location vertically above such table 211. As in other embodiments of the present invention, such an adhesive applicator assembly may be applied between the first fold and the second fold of the sheet(s) of paper stock. Likewise, as before, and as depicted in FIG. 3, such an adhesive applicator assembly may comprise an applicator 231 disposed in connection with an applicator tank 235. Such an applicator tank 235 may, in at least certain embodiments, be sufficiently large in size to reduce instances of refilling. Moreover, such an applicator tank 235 may be removably attached to such applicator 231, and by extension the manual adhesive applicator system 200 as a whole, thereby enabling the removal of an empty applicator tank 235 and the subsequent attachment of a full applicator tank 235, thereby further reducing efficiency loss when such an applicator tank 235 requires refilling. Further, such an applicator tank 235 may be pressurized and controlled via an adjustable pressure regulator to further reduce instances of refilling or adjustment thereof.

In at least one embodiment of the present invention, such as the one depicted in FIG. 3, such an adhesive applicator assembly be configured to automatically apply the adhesive to the sheet of paper stock. Accordingly, because such adhesive may necessitate application along a predetermined route in at least some embodiments of the present invention, it may be understood such automatic application of the adhesive may require the applicator 231 of such embodiment to move along at least one degree of freedom.

To facilitate such movement, such an applicator 231 may be disposed in connection with an applicator motor 232. Such an applicator motor 232 may comprise, for instance a step motor, or some other like component configured to provide movement to such applicator 231. In an embodiment wherein the applicator motor 232 comprises a step motor, it may be understood such applicator motor 232 may be configured using a programmable logic controller to enable the applicator 231 to rotate, wherein such applicator motor 232 may be configured using 4-20 milliamp control to coordinate motor travel adjustment.

Further, as depicted in FIG. 3, such an adhesive applicator assembly may further comprise an applicator arm 233 disposed in connection with an applicator track 234. Specifically, such applicator arm 233 may also be disposed in connection with such applicator motor 232, such that the applicator 231 may move longitudinally along such applicator arm 233 or, alternatively, rotate via the lever arm of same. Likewise, such applicator arm track 234 may be configured to allow the applicator 213 to travel along the longitudinal axis of same, such as through the applicator arm 233. Accordingly, it may be understood such applicator arm 233 and such applicator track 234 may be configured to enable the applicator 231 to travel and/or rotate in at least one degree of freedom.

Further, various embodiments of the present invention may utilize various types of applicators 231 themselves. For instance, such applicator 231 may comprise some outlet, nozzle, or other like component configured to enable the application of such adhesive therefrom. In connection therewith, it may be understood such applicator 231 may comprise various shapes, sizes, flow rates, and other like configurations. Indeed, in one embodiment of the present invention, such an applicator 231 may comprise a variable orifice, which may be configured to enable an operator thereof to control the flow rate of adhesive expelled therefrom.

In conjunction with the foregoing, certain embodiments of the present invention may further comprise additional components configured to enable an operator to mechanically adjust the adhesive applicator assembly, or other component of the manual adhesive applicator system 200 in general, such as the applicator's movement, originally disposed height, the flow rate of the adhesive, or some other like adjustment of same. For instance, in the embodiment depicted in FIG. 3, it may be seen such an embodiment may comprise an electronic assembly, which itself may comprise an operator console 241. Such operator console 241 may comprise, for instance, a processor disposed in connection with a memory having computer-readable instructions disposed thereon, such that the operator console 241 may be configured to control the manual adhesive applicator system 200 via a graphic user interface disposed in input-output relation therewith. Further, such an electronic assembly may further comprise a pedal switch 243, or some other like component configured to control the operation of the adhesive applicator assembly. As may be understood, such pedal switch 243 may be configured in communication with such operator console 241 for operation of such adhesive applicator assembly, or, alternatively, any other component of the manual adhesive applicator system 200.

Since many modifications, variations and changes in detail can be made to the described embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. An automated plant sleeve production assembly for forming a conical paper plant sleeve from a sheet of paper stock, said assembly comprising:

a folding table assembly comprising a proximal end and a distal end, with an elongated surface disposed there between;

said proximal end comprising a lifting platform configured to hold at least one sheet, said lifting platform disposed in connection with an actuator and a level switch, said actuator and said level switch conjunctively configured to move said at least one sheet to a vertical location substantially equal to that of said elongated surface;

said folding table assembly further comprising at least one lift feed roller configured to transport said at least one sheet from said lifting platform to said elongated surface;

said folding table assembly further comprising a first feed roller disposed in connection with a sensor, said first feed roller configured to transport said at least one sheet to a first folding assembly, said first folding assembly comprising at least one first fold guide configured to apply a first fold to said at least one sheet;

said folding table assembly further comprising at least one second feed roller configured to transport said at least one sheet further towards said distal end;

said folding table assembly further comprising an adhesive applicator assembly configured to apply an adhesive to said first fold while said at least one sheet is transported by said at least one second roller;

said folding table assembly further comprising at least one second fold guide configured to apply a second fold to said at least one sheet, said second fold disposed in overlapping relation with said first fold;

said folding table assembly further comprising at least one crease roller disposed to apply pressure to said second fold; and said folding table assembly further comprising at least one receptacle configured to receive said at least one sheet.

2. The assembly of claim 1, wherein said at least one sheet is precut into a substantially trapezoidal shape.

3. The assembly of claim 2, wherein said first fold is configured at a first operative distance from a first edge of said at least one sheet, said first operative distance comprising an amount sufficient to dispose said first fold at a location substantially coincident with a line of symmetry of said at least one sheet.

4. The assembly of claim 3, wherein said second fold is configured at a second operative distance from a second edge of said at least one sheet, said second operative distance comprising an amount sufficient to dispose said second fold at a location substantially coincident with said line of symmetry of said at least one sheet.

5. The assembly of claim 1, wherein said folding table assembly further comprises an operator console disposed in input-output relation with at least one processor for the operation of said folding table assembly.

6. The assembly of claim 1, wherein said adhesive applicator assembly comprises an applicator disposed in fluid communication with at least one applicator tank.

7. The assembly of claim 6, wherein said applicator is configured to remain stationary.

8. The assembly of claim 7, wherein said applicator is operatively oriented to apply said adhesive substantially coincident with said line of symmetry of said at least one sheet.

9. An automated sleeve production assembly for forming a conical paper sleeve from a sheet of paper stock, said assembly comprising:

a folding table assembly having a proximal end and distal end, with an elongated surface disposed there between, said folding table assembly comprising:

a lift table assembly comprising a lifting platform disposed in connection with a level switch and an actuator, said lift table assembly configured to vertically move said at least one sheet to a vertical location substantially equal to said elongated surface;

a feed assembly comprising at least one first feed roller and at least one second feed roller, said feed assembly configured to transport said at least one sheet longitudinally along said elongated surface;

a first folding assembly configured to apply a first fold to said at least one sheet;

an adhesive applicator assembly comprising an applicator disposed in fluid communication with at least one applicator tank, said adhesive applicator assembly configured to apply an amount of adhesive onto said first fold while said applicator remains stationary;

a second folding assembly configured to apply a second fold to said at least one sheet; and a crease assembly configured to apply pressure to said second fold.

10. The assembly of claim 9, wherein said at least one sheet is precut into a substantially trapezoidal shape.

11. The assembly of claim 10, wherein said first fold is disposed at a first operative distance from a first edge of said at least one sheet, said first operative distance substantially coincident with a line of symmetry of said at least one sheet.

12. The assembly of claim 11, wherein said second fold is disposed at a second operative distance from a second edge of said at least one sheet, said second operative distance substantially coincident with said line of symmetry of said at least one sheet.

13. A manual adhesive applicator assembly for forming a conical paper sleeve from a sheet of paper stock, said assembly comprising:

a frame assembly comprising a table, said table comprising at least one folding element;

said frame assembly further having an adhesive applicator assembly disposed thereon, said adhesive applicator assembly configured to apply an amount of adhesive to a sheet of paper stock;

said adhesive applicator assembly comprising an applicator disposed in connection with at least one applicator tank, a step motor, and an applicator arm, said applicator arm disposed in connection with an applicator arm track;

said applicator comprising a variable orifice; and said applicator disposed at a predetermined location above said table, and configured to travel along a predetermined route while applying said amount of adhesive to said sheet of paper stock.

* * * * *